US012287262B2

(12) United States Patent
Le Comte et al.

(10) Patent No.: US 12,287,262 B2
(45) Date of Patent: Apr. 29, 2025

(54) DEVICE AND METHOD OF STAINING AN ORGANIC MATERIAL ON A SLIDE

(71) Applicant: DIAGDEV, Castries (FR)

(72) Inventors: Roger Le Comte, Castries (FR); Paul Moreno, Castries (FR)

(*) Notice: Subject to any disclaimer, the term of this patent is extended or adjusted under 35 U.S.C. 154(b) by 1217 days.

(21) Appl. No.: 16/753,854

(22) PCT Filed: Oct. 8, 2018

(86) PCT No.: PCT/FR2018/052480
§ 371 (c)(1),
(2) Date: Apr. 6, 2020

(87) PCT Pub. No.: WO2019/069038
PCT Pub. Date: Apr. 11, 2019

(65) Prior Publication Data
US 2020/0278277 A1 Sep. 3, 2020

(30) Foreign Application Priority Data
Oct. 6, 2017 (FR) ...................................... 1759397

(51) Int. Cl.
G01N 1/31 (2006.01)
G01N 1/28 (2006.01)
(52) U.S. Cl.
CPC ........... G01N 1/312 (2013.01); G01N 1/2813 (2013.01); G01N 2001/317 (2013.01)
(58) Field of Classification Search
None
See application file for complete search history.

(56) References Cited

U.S. PATENT DOCUMENTS 5,650,332 A * 7/1997 Gao ..................... G01N 1/2813
427/2.11
5,854,075 A 12/1998 Levine et al.
(Continued)

FOREIGN PATENT DOCUMENTS

CN 103149070 A 6/2013
EP 2365312 A2 3/2011
(Continued)

OTHER PUBLICATIONS

European Patent Office; NL; Feb. 11, 2019.

Primary Examiner — Brian R Gordon
(74) Attorney, Agent, or Firm — Patshegen IP; Moshe Pinchas

(57) ABSTRACT

Disclosed is a device (10) for staining an organic element on at least one slide (105), said slide defining an axis (110) contained within the plane of the slide, the device being characterized in that it comprises:
at least one slide support on which is positioned the slide holding the organic element,
at least one means (115) for spreading a staining fluid and/or a rinsing fluid on the slide, which means is paired with a means for relative displacement in translation in relation to the slide and along the axis of said slide, the spreading means having a linear element (120) extending along an axis perpendicular to the axis of the slide and supplied with spreading fluid, and
at least one suction means (115) for suctioning the staining fluid and/or the rinsing fluid, said suction means being paired with a means for relative displacement in translation in relation to the slide along the axis of said slide.

12 Claims, 4 Drawing Sheets

(56) References Cited

U.S. PATENT DOCUMENTS

| | | | |
|---|---|---|---|
| 6,258,322 B1* | 7/2001 | Meikle | G01N 1/2813 |
| | | | 118/100 |
| 2002/0019892 A1 | 12/2002 | Bukshpan et al. | |
| 2003/0003022 A1* | 1/2003 | Tamura | G01N 1/2813 |
| | | | 118/100 |
| 2013/0032393 A1 | 2/2013 | Toyama | |
| 2016/0370264 A1* | 12/2016 | Campbell | G01N 1/312 |
| 2017/0315030 A1* | 11/2017 | Kubota | G01N 35/00029 |
| 2018/0188140 A1* | 7/2018 | Kubota | G01N 35/04 |
| 2018/0290181 A1* | 10/2018 | Yamasaki | G01N 35/00029 |
| 2020/0278277 A1* | 9/2020 | Le Comte | G01N 1/2813 |
| 2021/0116333 A1* | 4/2021 | Ikuta | G01N 1/312 |
| 2022/0082480 A1* | 3/2022 | Liu | G01N 1/2813 |

FOREIGN PATENT DOCUMENTS

| | | | |
|---|---|---|---|
| EP | 2645469 A1 | 10/2011 | |
| EP | 2638381 B1 | 11/2011 | |
| JP | 2001091423 A | 4/2001 | |
| JP | 2005342888 A | 12/2005 | |
| WO | 2012064873 A1 | 5/2012 | |

* cited by examiner

DEVICE AND METHOD OF STAINING AN ORGANIC MATERIAL ON A SLIDE

REFERENCE TO RELATED APPLICATIONS

This application is the national stage application of the international application PCT/FR2018/052480 filed on Oct. 8, 2018 which claims priority from commonly owned FR Patent Application Serial No. 1759397, filed on Oct. 6, 2017.

TECHNICAL FIELD OF THE INVENTION

The present invention relates to a device and method of staining an organic material on at least one slide.

It applies, in particular, to the field of biomedical analyses, and more specifically in the field of hematology, bacteriology or histology.

STATE OF THE ART

Staining is a routine activity for medical analysis laboratories including physicians and veterinarians. It can be manual or automated.

In the hematology field, the operator smears a drop of blood on a glass slide to form a thin layer of blood cells. After drying, the smear is placed in contact with a colorant, or successively with several colorants, each being specific to a family of cells. The contact time of the cells with the set of colorants allows the intensity of the colorant to be adjusted. A cleaning swab is often necessary at the end of the staining cycle. This staining step is essential for identifying cells under a microscope.

In the bacteriology field, the operator deposits a portion of a sample on a glass slide and then it is heat fixed. The sample is then placed in contact with one or more colorants or decolorants in order to distinguish the element looked for. The samples are obtained, for example, from urine, pus or culture media. The two stains used more frequently are the one known as the "GRAM" stain, for distinguishing GRAM+ and GRAM− types of bacteria, and the stain for detecting tuberculosis.

The histology field is similar. The samples are obtained from human tissues. The most common stain is the one known as Papanicolaou, largely used in particular for vaginal smears. There are many colorants and alcohols.

No rigorous protocols for manual staining exist that could amount to reference procedures. Regardless of the field, the operator can choose to put the various colorants and rinsing liquids in different jars and then successively immerse his slides to be stained in the previously prepared jars. He can operate otherwise, by placing the slides to be stained on bars positioned over a sink and then depositing copious amounts of the various colorants and rinsing liquids using wash bottles, thus causing a spillage.

In all cases, the contact time with the various products determined by a protocol must be observed, thus requiring stopwatches or timers to be used. The slides must then be dried so they can be used under a microscope.

There is also a device for automatic staining by immersion. In this common embodiment for automatic staining by immersion, the slides are grouped together in a basket, generally with a capacity of 10 to 20 slides. The basket is taken in charge by a mechanism which enables it to be immersed successively in a plurality of tanks containing the various colorants and the rinsing liquid. An empty final tank equipped with a fan can be reserved for drying the slides at the end of the staining cycle.

In the hematology case, and according to the conventional methods, for example May-Grunwald Giemsa or Wright Giemsa, it is essential to dilute the Giemsa colorant just before use.

Regardless of the field, it is known that this type of staining leads to a reagent being contaminated by the previous one, resulting in a progressive degradation in the staining. The contamination of one slide by another (cells passing from one slide to another) remains possible because of the presence of different samples in the same baths. This is frequently considered an unacceptable risk in bacteriology. By and large, there is significant colorant consumption and waste production.

One variant of automatic staining by immersion consists of using a plurality of unitary staining dishes. These are successively filled with the various colorants or rinsing liquids. In this example of realization, the colorants are most often thrown away after use, which ensures high repeatability and constant quality for the coloration. The risk of risk of inter-sample contamination is eliminated. The consumption of colorants remains high.

There are also devices for automatic staining by capillarity, applied solely in the hematology field. They use the capillarity principle and use very few colorants. The staining is obtained from fast staining. The staining protocol is unique and not parameterizable.

Procedures for automatic staining by depositing liquid exist that reproduce manual coloration over the sink mentioned above. The slides to be stained are placed on a turntable. Each slide passes under a series of wash bottles and receive the colorant specified by the protocol. The slides are emptied by accelerating the turntable, and pre-dried in the same way. The risk of contamination between slides is eliminated, but the consumption of colorants, used in excess, is significant. Cleaning the bowl of the centrifuge isn't pleasant for the operator.

Finally, there is automatic spray staining. The slides are placed on a centrifuge rotor with the smear oriented towards the wall of the centrifuge, which is equipped with several nozzles that vaporize the selected colorant as the slide passes. The colorant is only used once. The major drawback of this technique is the risk of the spray nozzles, necessarily of a small diameter, being blocked. Special colorants had to be developed to overcome this major drawback. The maintenance and verification procedures must be complied with absolutely.

The staining of the slides in a horizontal position has the advantage of not requiring dishes or tanks to contain the various "fluids" to be put into contact with the cells, generally colorants and rinsing liquids. The state of the art shows that, in a horizontal situation, the fluids are deposited on the slide by spillage and therefore in excess. It is therefore necessary to have a collecting jar that has to be emptied and cleaned. The major drawbacks are the consumption of colorants, which is not optimized, with as direct consequence an increase in the volume of waste to be treated and, in the context of automation, the impossibility of properly transporting the slide.

SUBJECT OF THE INVENTION

The present invention aims to remedy all or part of these drawbacks. In particular, the present invention is aimed at having automation of the staining with a slide positioned in a horizontal position, to eliminate any risk of inter-sample contamination while using a limited amount of colorant, thereby reducing the production of waste.

To this end, according to a first aspect, the present invention relates to a device for staining an organic element on at least one slide, said slide defining an axis contained within the plane of the slide, the device being characterized in that it comprises:
- at least one slide support on which is positioned the slide holding the organic element;
- at least one means for spreading a staining fluid and/or a rinsing fluid on the slide, which means is paired with a means for relative movement in translation in relation to the slide and along the axis of said slide, the spreading means having a linear element extending along an axis perpendicular to the axis of the slide and supplied with spreading fluid; and
- at least one suction means for suctioning the staining fluid and/or the rinsing fluid, said suction means being paired with a means for relative movement in translation in relation to the slide along the axis of said slide.

Thanks to these provisions, the consumption of fluids is low, and therefore the generated waste to be treated by the laboratory is low. In addition, the device that is the subject of the present invention offers the possibility of mixing fluids directly on the slide and then homogenizing the mixture perfectly if necessary. Also, the device that is the subject of the present invention has no tanks or other containers to be cleaned. The small amount of fluid on the slide means it can be transported without spillage in the context of automation. The spreading means is able to carry out the distribution of fluid, its spreading and its possible homogenization.

Compared to capillary staining, the device that is the subject of the present invention is not limited to hematology with a single protocol and a single set of colorant usable.

Compared to automatic spray staining, the device that is the subject of the present invention is differentiated by the absence of pulverization, whose main drawbacks are the risk of the injection nozzles being blocked, which obliges the laboratories to use dedicated sets of colorants, and the need to clean the bowl of the centrifuge.

The device that is the subject of the present invention makes it possible to use a small amount of fluid, which is only used once to ensure staining with a constant and repeatable quality, the individual treatment of each slide eliminating the risk of contamination from one slide to another and the small amount of generated biological waste to be treated.

Compared to immersion stainings, the device that is the subject of the present invention enables individual treatment of each slide with colorants used a single time. This arrangement thus eliminates any risk of one colorant being contaminated by the previous one or one sample by another.

Compared to automatic staining by depositing colorant, the device that is the subject of the present invention is clearly differentiated by the small amount of colorants used and having no cleaning of a fluid collecting jar bowl.

Compared to immersion stainings in collective dishes, the device that is the subject of the present invention is clearly differentiated by the small amount of colorants used, the absence of risk of contamination between slides and the reduction in emissions.

Compared to immersion stainings in individual dishes, the device that is the subject of the present invention is clearly differentiated by the small amount of colorants used and the reduction in emissions.

In some embodiments, at least one suction means comprises a linear element extending along an axis perpendicular to the axis of the slide for carrying a suctioned fluid.

These embodiments make it possible to suction the liquids to be removed from the slide over the entire width of the slide. The speed of movement of the suction means over the slide, the suction force and the number of passages makes it possible to partially or totally remove the fluid present on the slide.

In some embodiments, the linear element of at least one spreading means is the linear element of at least one suction means.

The advantage of these embodiments is that they make it possible to limit the dimensions of the device.

In some embodiments, the suction means is positioned in succession to the spreading means, and the device comprises a means for controlling the spreading means and suction means simultaneously, creating a turbulent flow for cleaning the slide.

The advantage of these embodiments is to create a mechanical friction of a mixture of liquid and air cleaning the impurities of the organic element spread over the slide without detaching the cells contained in the organic element.

In some embodiments, at least one spreading means comprises two fluid supply means utilized simultaneously.

These embodiments make it possible for sensitive colorants needing to be applied immediately after mixing, for example Giemsa, to be mixed directly on the slide. The liquids are therefore mixed on the slide by the two supply means.

In some embodiments, the spreading means comprises a means for mixing fluids coming from the supply means.

These embodiments make it possible to ensure that the fluids coming from the supply means are mixed.

In some embodiments, for hematology, in which the organic element is an organic liquid, it also comprises:
- at least one dispenser of at least one drop of organic liquid on the slide placed on the support;
- at least one smearing means perpendicular to the axis of the slide smearing the organic liquid in the axis of the slide; and
- at least one means for lifting a deactivated smearing means in order to lower the smearing means above the slide to come into contact with the drop of organic liquid, which migrates by capillarity over the smearing means perpendicular to the axis of the slide, the drop being smeared by relative movement between the smearing means and the slide.

Thanks to these provisions, the device that is the subject of the present invention performs the smear and the staining. The slide can therefore be treated completely by the device.

In some embodiments, the device that is the subject of the present invention comprises a tank for cleaning the smearing means, into which the smearing means is lowered to be cleaned.

These embodiments make it possible to clean the smearing means between two juxtaposed slides, for example.

In some embodiments, the volume of a spread staining fluid and/or rinsing fluid is between 0.4 milliliters and 1 milliliter for a rectangular slide of 25 millimeters by 75 millimeters.

Thanks to these provisions, a very small volume of liquid is spread over the slide, and therefore there is no spillage of the staining fluid and/or rinsing fluid. The movement of the slide is therefore also facilitated. In addition, the amount of waste is limited.

In some embodiments, the device that is the subject of the present invention comprises at least two juxtaposed slide supports and means for relative displacement between the staining device and each slide, The displacement means being configured to position the staining device along the axis of each slide in succession.

The advantage of these embodiments is to automate the staining of several successive slides.

According to a second aspect, the present invention relates to a method of staining an organic material on at least one slide, said slide defining an axis contained within the plane of the slide, the method being characterized in that it comprises the following steps:
  positioning at least one slide holding the organic element on at least one slide support;
  spreading a staining fluid and/or a rinsing fluid on the slide by means of a linear element along an axis perpendicular to the axis of the slide; and
  suctioning the staining fluid and/or a rinsing fluid by means of a linear element along an axis perpendicular to the axis of the slide.

In some embodiments, the method that is the subject of the present invention also comprises the following steps:
  distributing at least one drop of organic liquid on the slide;
  lowering a smearing means above the slide;
  smearing the organic liquid along the axis of the slide by movement between the smearing means and the slide; and
  lifting the smearing means.

As the particular aims, advantages and features of the method that is the subject of the present invention are similar to those of the device that is the subject of the present invention, they are not repeated here.

BRIEF DESCRIPTION OF THE FIGURES

Other advantages, aims and particular features of the invention will become apparent from the non-limiting description that follows of at least one particular embodiment of the device and method that are the subjects of the present invention, with reference to drawings included in an appendix, wherein.

DESCRIPTION OF EXAMPLES OF REALIZATION OF THE INVENTION

The present description is given in a non-limiting way, each characteristic of an embodiment being able to be combined with any other characteristic of any other embodiment in an advantageous way. In addition, each parameter of an example of realization can be utilized independently from the other parameters of said example of realization.

The meaning of the following terms is noted here:
  "juxtaposed" means elements are placed side by side;
  "in succession" and "successively" means one after the other; and
  "linear" refers to the continuous aspect of a line.

It is now noted that the figures are not to scale.

Figure 1:
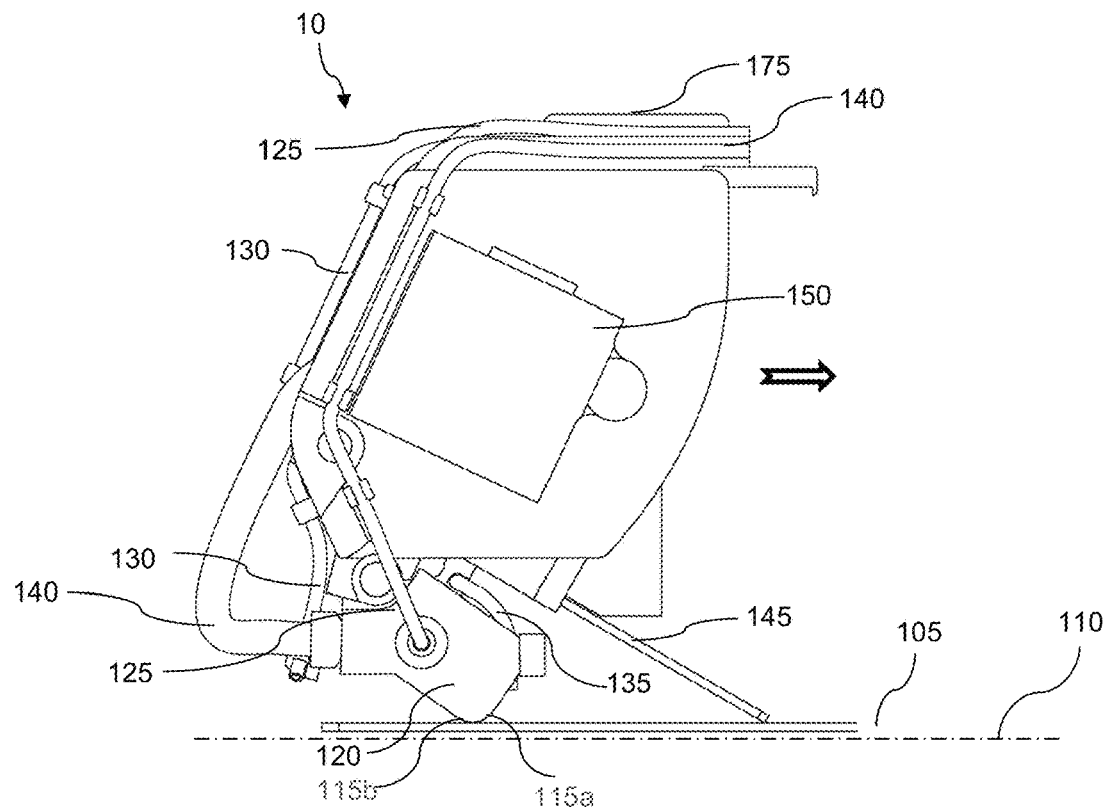
FIG. 1 represents, schematically and in a side view, a first particular embodiment of the device that is the subject of the present invention.
Figure 3:
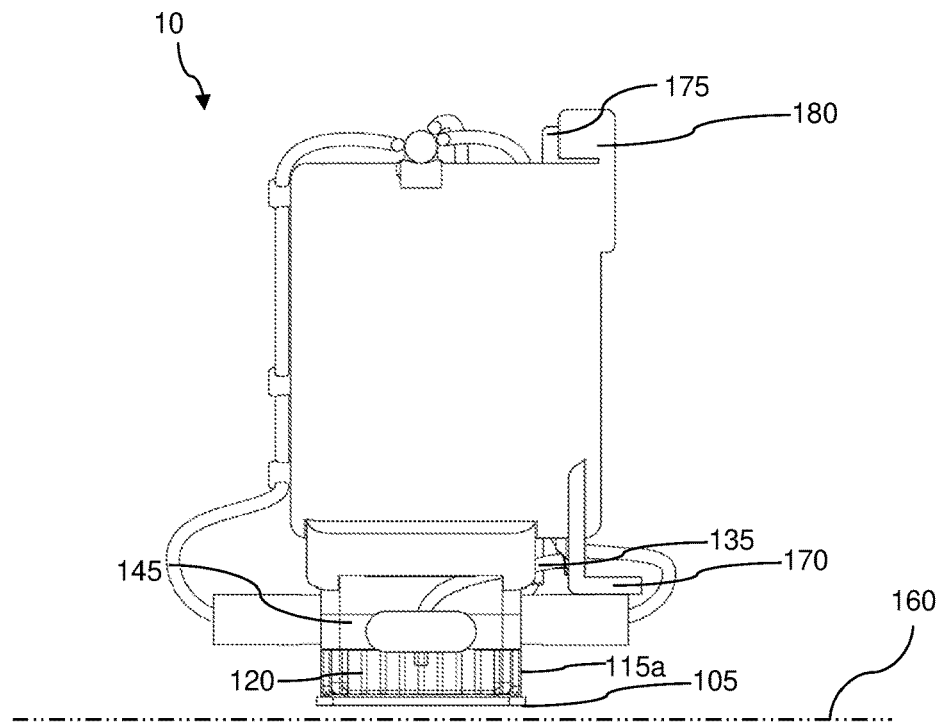
FIG. 3 represents, schematically and in a front view, the first particular embodiment of the device that is the subject of this invention.

FIGS. 1 and 3 show several schematic views of an embodiment of the device 10 that is the subject of the present invention. The device 10 for staining an organic element on at least one slide 105 comprises a slide 105 support (not shown) on which is positioned the slide 105. The slide 105 defines an axis 110 contained within the plane of the slide 105.

For clarity, here, a slide for biomedical analyses is a thin, flat, rectangular piece of glass used as a support for medical analyses. The axis of the slide 105 is the axis passing via the middle of the rectangle of the slide 105 and parallel to the largest side of the rectangle. It is also noted that an organic element is body tissue, blood or any other sample taken from a living being.

The slide 105 support enables the slide to be placed in a horizontal position. In some embodiments, the slide 105 support keeps the slide in a horizontal position. The slide 105 support can be any means known to the person skilled in the art, fixed relative to the device 10.

In some embodiments, the organic element is positioned on the slide 105 before the slide 105 is placed on the support.

The device 10 also comprises a means 115a for spreading a staining fluid and/or a rinsing fluid on the slide 105, paired with a means 175 for relative movement in translation in relation to the slide 105 along the axis 110 of the slide 105, the spreading means 115a having a linear element 120 extending along an axis 160 perpendicular to the axis 110 of the slide 105 and supplied with spreading fluid.

In some embodiments, the linear element 120 has at least two channels emerging close to the slide. The distance between the outlet of the channels 120 and the slide 105 is less than five millimeters. The channels are parallel to each other close to the slide such that each channel 120 delivers a similar amount of liquid. Preferably, the distance between the outlet of the channels 120 and the slide 105 is 0.3 millimeters.

In some embodiments, the linear element 120 has a slot. A slot is an aperture whose shape is contained within a rectangle and where the ratio of the large to small sides is greater than two. Preferably, the slot is rectangular and the dimension of the small side is equal to the dimension of a channel.

The linear element 120 is supplied by tubes 125, 130, 135 for delivering fluids, connected to tanks (not shown), each containing staining or rinsing fluid. A pump (not shown) handles the supply of fluid from the tank.

Figure 2:
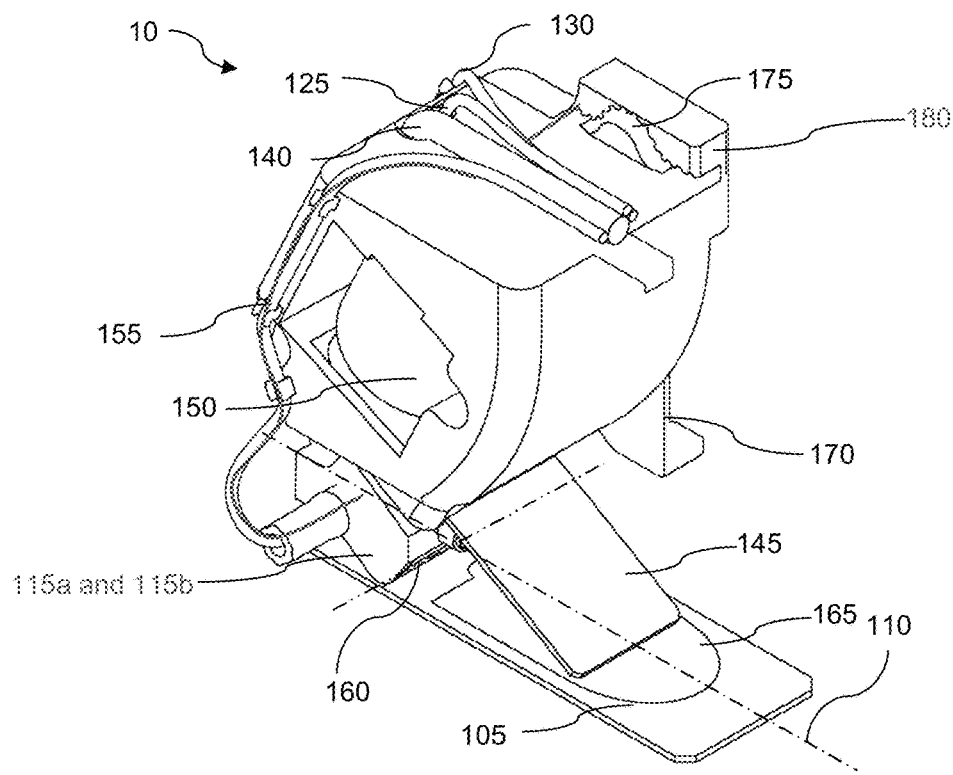
FIG. 2 represents, schematically and in perspective, the first particular embodiment of the device that is the subject of the present invention.

In the embodiment shown in FIGS. 1 to 3, the tube 135 is connected to a tank containing a rinsing fluid, and the tubes 125 and 130 are connected to tanks containing staining fluids. Preferably, all the tubes, 125, 130 and 135, emerge in the spreading means 115a in the middle of the distance between the channels 120 farthest apart, or in the middle of the slot, for example.

Preferably, the volume of a spread staining fluid and/or rinsing fluid is between 0.4 milliliters and 1 milliliter for a rectangular slide 105 of 25 millimeters by 75 millimeters.

In some embodiments, the spreading means 115a comprises two fluid supply means utilized simultaneously. A supply means comprises at least one tube, 125, 130 or 135, one pump and one tank. In these embodiments, two staining fluids reacting together to stain the organic fluid are mixed and delivered simultaneously. The tubes, 125 and 130, are supplied simultaneously with staining fluid. For example, one staining fluid is the Giemsa staining fluid and one staining fluid is a Giemsa diluent.

The supply means are activated simultaneously, for example after the command issued by the control means 180, and the two staining fluids are mixed at the entry of the channels 120 into the spreading means 115*a*.

In some embodiments, the spreading means 115*a* comprises a means for mixing fluids coming from the supply means. The mixing means can be a screw or mixer or, when the spreading means and the suction means are combined, a spreading of the fluids mixed at the entry of the channels and then at least one suctioning of these fluids and another spreading of the suctioned fluids. More generally, the mixing means is configured to create a turbulent flow between the fluids to homogenize the mixture of the fluids.

In some embodiments, at least one tube 130 is attached to the spreading means 115*a* by tabs in the form of a deformable hook on a casing of the device 10. In some embodiments, at least one tube 125 is attached to the spreading means 115*a* by passing through the casing of the device 10.

The movement means 175 can be a rack and a corresponding toothed wheel, or a pulley and belt assembly, in the axis 110 of the slide 105. Control of the movement means 175 can be performed by a stepping motor.

The device 10 comprises a suction means 115*b* for suctioning the staining fluid and/or a rinsing fluid, paired with a means 175 for relative movement in translation in relation to each slide 105 along the axis 110 of said slide 105.

Preferably, the suction means 115*b* comprises a linear element extending along an axis 160 perpendicular to the axis 110 of the slide 105 for carrying a suctioned fluid.

In some embodiments, the linear element 120 has at least two channels emerging close to the slide 105. The distance between the outlet of the channels 120 and the slide 105 is less than five millimeters. The channels are parallel to each other close to the slide such that each channel 120 suctions up a similar amount of liquid. Preferably, the distance between the outlet of the channels 120 and the slide 105 is 0.3 millimeters.

In some embodiments, the linear element 120 has a slot. A slot is an aperture whose shape is contained within a rectangle and where the ratio of the large to small sides is greater than two. Preferably, the slot is rectangular and the dimension of the small side is equal to the dimension of a channel.

The linear element 120 is connected to a suction tube 140 for suctioning waste fluids connected to a waste tank. A pump (not shown), for example managed by a control means, handles the suctioning up of fluids on a slide 105 towards the waste tank. Preferably, the tube 140 emerges in the suction means 115*b* in the middle of the distance between the channels 120 farthest apart, or in the middle of the slot, for example.

In some embodiments, the tube 140 is attached to the suction means 115*b* by tabs in the form of a deformable hook on a casing of the device 10. In some embodiments, the tube 140 is attached to the suction means 115*b* by passing through the casing of the device 10.

The movement means 175 can be a rack and a corresponding toothed wheel, or a pulley and belt assembly, in the axis 110 of the slide 105. Control of the movement means 175 can be performed by a stepping motor.

Preferably, the linear element 120 of the spreading means 115*a* is the linear element 120 of the suction means 115*b*. This embodiment is represented in FIG. 1. In some embodiments, all the tubes, 125, 130, 135 and 140, emerge in the spreading means 115*a* in the middle of the distance between the channels 120 farthest apart, or in the middle of the slot, for example.

In some embodiments not shown in FIGS. 1 to 3, the suction means 115*b* is positioned in succession to the spreading means 115*a* along the axis 110 of the slide 105, the simultaneous utilization of the spreading means 115*a* and the suction means 115*b* creating a turbulent flow for cleaning the slide 105. In other words, the suction means is positioned in succession to the spreading means, and the device comprises a means for controlling 180 the spreading means and suction means simultaneously, creating a turbulent flow for cleaning the slide. In these embodiments, a cleaning liquid is ejected by the spreading means 115*a* and immediately suctioned up by the suction means 115*b*.

The suctioning by the suction means 115*b* simultaneously suctions up air and the liquid ejected, thus creating a mechanical friction between the cleaning liquid and the stained organic element. The impurities in the stained organic element are detached from the stained organic element and suctioned up with the cleaning liquid. The stained cells are held in place. The impurities are, for example, colorant precipitates formed during the spreading of the colorant.

Preferably, the distance between the linear element 120 of the spreading means 115*a* and the linear element 120 of the suction means 115*b* is less than two millimeters. And the linear elements 120 are parallel.

In some embodiments, for hematology, the device 10 also comprises:
  at least one dispenser 170 of at least one drop of organic liquid on the slide placed on the support;
  at least one smearing means 145 perpendicular to the axis 110 of the slide 105 smearing the organic liquid in the axis 110 of the slide 105; and
  at least one means 150 for lifting a deactivated smearing means 145 in order to lower the smearing means 145 above the slide 105 to come into contact with the drop of organic liquid, which migrates by capillarity over the smearing means perpendicular to the axis 110 of the slide 105, the drop being smeared by relative movement between the smearing means 145 and the slide 105.

The device 10 also comprises a distributor 170 distributing at least one drop of organic liquid on the slide 105. The distributor 170 can comprise a means for setting the organic liquid in rotation.

The smearing means 145 is preferably a rectangular slide in which the dimension of the smallest side is less than or equal to the dimension of the slide 105 perpendicular to the axis 110 of the slide 105. The slide of the smearing means 145 is inserted into a support comprising one portion made of a material sensitive to a magnetic force juxtaposed with a portion made of glass. The smearing means 145 comprises a means for setting in rotation relative to the casing of the device 10. The axis of rotation of the means for setting the smearing means 145 in rotation is perpendicular to the axis 110 of the slide 105. The axis of rotation is located at the junction of the portion made of a material sensitive to a magnetic force and the portion made of glass.

The lifting means 150 is an electromagnet located above the portion made of a material sensitive to a magnetic force. The electromagnet, once released, frees the portion of the slide of the smearing means 145 made of a material sensitive to a magnetic force, which causes the portion made of glass to be lowered towards the slide 105. The pressure exerted on the slide 105 by the smearing means 145 is provided by at least one spring.

Only the line segment 146 at the extremity of the portion of the slide made of glass is in contact with the slide 105. In this way, a drop of organic liquid placed on the axis 110 of the slide 105 is spread over the line segment 146 by capillarity when the line segment 146 comes into contact with the drop. Then, the drop spread in this way over the line segment 146 is driven by movement of the lowered smearing means 145 along the axis 110 of the slide 105, and therefore smeared 165 by capillarity. The line segment 146 forms an angle with the slide 105 such that only one edge of the parallelepiped formed by the slide of the smearing means 145 is in contact with the slide 105.

The movement can be performed by a movement means 175. The movement means 175 can be a rack and a corresponding toothed wheel, or a pulley and belt assembly, in the axis 110 of the slide 105. Control of the movement means 175 can be performed by a stepping motor.

In some embodiments, the spreading means 145 can be a slide lowered by translation. In some embodiments, the lifting means 150 can be any means for setting in rotation or in translation of an element known to the person skilled in the art.

In some embodiments, the device 10 comprises a tank 70 for cleaning the smearing means 145, into which the smearing means 145 is lowered to be cleaned. The cleaning tank is placed in the axis 110 of the slide 105. Once the drop has been smeared, the smearing means 145 is lifted and lowered again into the cleaning tank 70 to prevent any contamination of one organic fluid sample by another.

The cleaning tank 70 has the shape of a sloping chamfer or side of a triangle 705 and comprises, on one surface, a spreading means 710 and a suction means 710 similar to those described above, creating a turbulent flow as indicated above. The fluid used is an isotonic diluent. In other embodiments, the isotonic fluid is spread in the cleaning tank 70 and the cleaning is performed by immersion of the smearing means 145.

Preferably, the cleaning tank 70 comprises a drain 715 for cleaning fluid.

In FIGS. 1 to 3, the embodiment of the device 10 shown comprises the distributor at least one drop of organic liquid, the spreading means 115*a* and the suction means 115*b* whose channels 120 are combined, the lifting means 150 and the smearing means 145 grouped together in a casing. The means 175 for displacing the spreading means, suction means 115*b* and smearing means 145 are a single movement means 175. The device 10, of FIGS. 1 to 3, is mounted on a chassis (not shown) comprising a slide 105 support fixed relative to the chassis. The movement means 175 displace the device 10 relative to the chassis, along the axis 110 of said slide 105.

In other embodiments, the device 10 is fixed relative to the chassis and each slide 105 is mobile relative to the chassis. The movement means 175 displaces each slide 105 relative to the chassis, along the axis 110 of said slide 105.

These embodiments make it possible to have a compact device 10 particularly suited to analysis laboratories carrying out a limited number of analyses every day.

Figure 4:
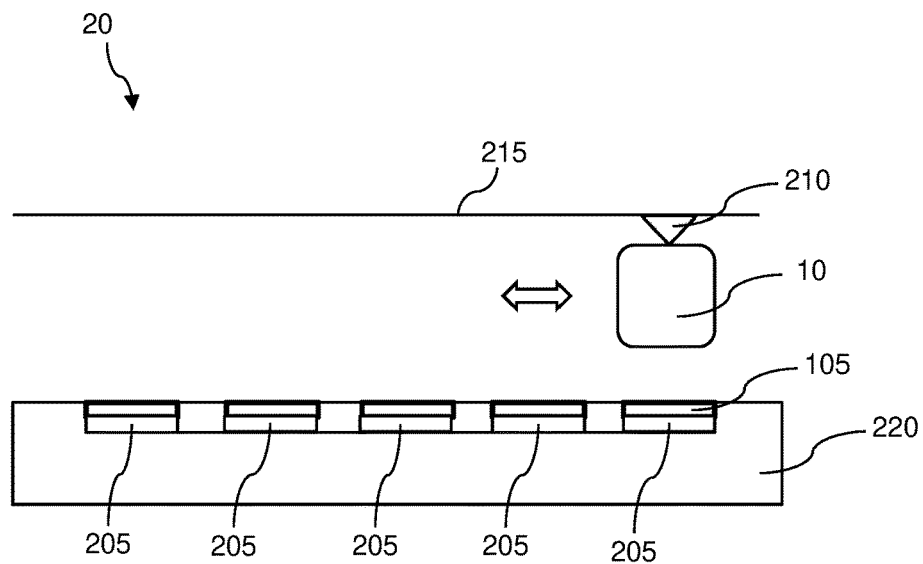
FIG. 4 represents, schematically and in a side view, a second particular embodiment of the device that is the subject of this invention.
Figure 5:
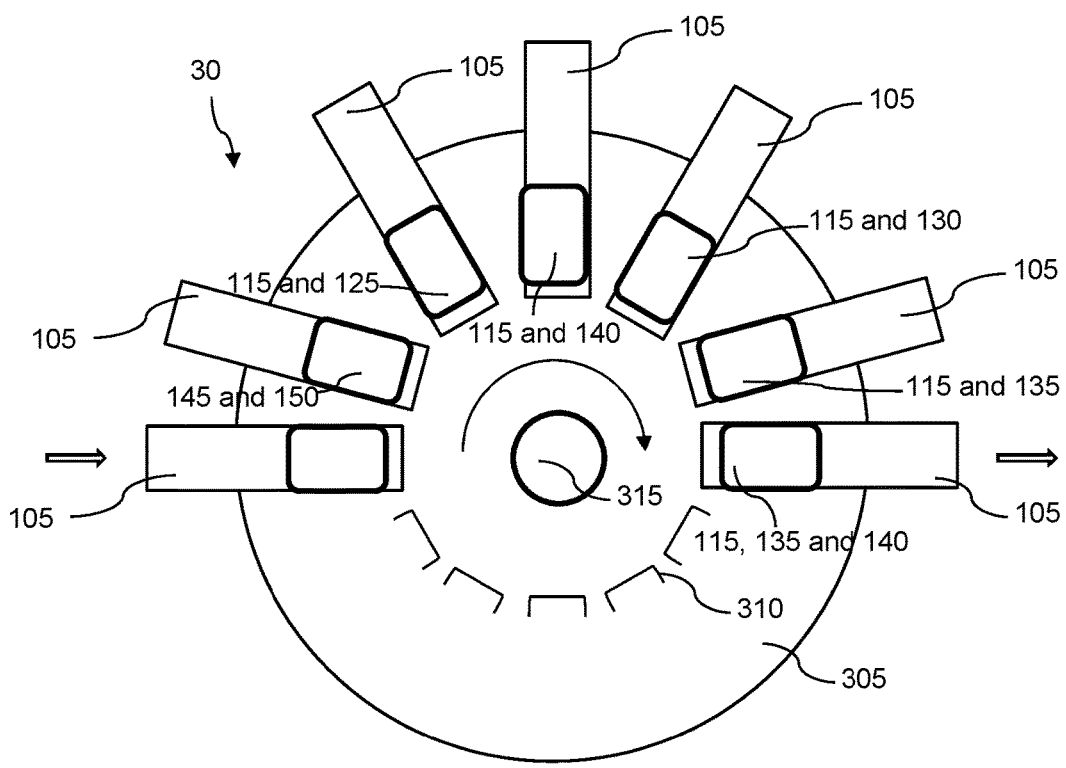
FIG. 5 represents, schematically and in a side view, a third particular embodiment of the device that is the subject of the present invention.

The embodiments of the staining device, 20 and 30, shown in FIGS. 4 and 5, the device, 20 or 30, comprises at least two juxtaposed supports, 205 or 310, for slides 105 and means, 210 or 315, for relative displacement between the staining device and each slide, configured to position the staining device 10 along the axis 110 of each slide 105 in succession.

In FIG. 4, each slide support 205 keeps a slide 105 in a horizontal position in a rack 220. The axes 110 of the slides 105 are parallel. The displacement means 210 is a rack and a corresponding means or a pulley and belt assembly, in an axis perpendicular to the axis 215 of each slide 105. The displacement means 210 can be any means for displacement in translation known to the person skilled in the art. Control of the displacement means 210 can be performed by a stepping motor. In FIG. 4, the device 10 corresponds to the device 10 shown in FIGS. 1 to 3.

The device 10 performs a first pass for smearing the smear and several other passes, spaced by lengths of time controlled, for example by a control means 180, as a function of the contact times of the colorants, for the different colorants and rinse. In some embodiments, the device 10 also has means for homogenizing the tubes of blood, piercing the plug, taking a sample of the blood and forming a drop.

FIG. 5 shows a third particular embodiment of the device 30 that is the subject of the present invention. In the device 30, the various means carrying out the various functions are separated into at least two different modules of device 10. All the modules form the device that is the subject of the present invention.

In the embodiment shown, the modules are arranged in a circular arc and each slide is displaced relative to the modules along an axis corresponding to the radius of the circular arc that corresponds to a position of the axis 110 of a slide 105. The device 30 comprises several slide supports 310, and the slide supports 310 are arranged in a circle on a carousel having a circular disk shape 305. For clarity, here, a carousel is an appliance intended for transporting, in a closed circuit, loads, objects or goods.

The slides 105 are loaded onto the carousel 305 when the slide support 310 is situated at a first location, represented by an arrow towards the carousel 305 on the left of FIG. 5. The slide 105 is unloaded from the carousel 305 in a location other than the loading location, and before a complete rotation of the carousel 305. The loading and unloading of the slides can be automated.

The axis 110 of each slide 105 corresponds to a radius of the carousel. The circular arc between the axis 110 of each slide 105 is identical. The supports 310 for slide 105 are spread evenly on an upper surface of the carousel 305.

The carousel is considered to comprise n locations juxtaposed or side by side on the circular arc, each location forming a different radius. A module of the device 10 can be positioned opposite a location. A module can comprise:

a distributor 170 distributing at least one drop of organic liquid on a slide 105;
a means 115*a* for spreading a staining fluid;
a means 115*a* for spreading a rinsing fluid;
a spreading means 115*a* comprising two staining fluid supply means utilized simultaneously;
a suction means 115*b* different from each spreading means;
a spreading means 115*a* whose channels 120 are combined with the channels of a suction means 115*b*;
a smearing means 145 and a lifting means 150;
a spreading means and a suction means positioned in succession, and the device comprises a means for controlling 180 the spreading means and suction means simultaneously, creating a turbulent flow for cleaning the slide;

or a combination of the above means.

An example of the embodiment shown in FIG. 5 is described below.

The loading position contains a module comprising a distributor 170. The module in the next position comprises a smearing means 145 and a lifting means 150. The following module comprises a means 115*a* for spreading a staining fluid. The very next module comprises a means 115*b* for suctioning a staining fluid. The next module comprises a means 115*a* for spreading two staining fluids simultaneously. The following module comprises a means 115*a* for spreading a rinsing fluid. Lastly, the final module before unloading comprises a module 115*b* for suctioning the rinsing fluid.

The unloading location is shown by an arrow on the right of the device 30 of FIG. 5. The rotation of the carousel 305 can be punctuated by drying phases of a predetermined length. Preferably, to control the drying time for each staining phase, each spreading means 115*a* comprises channels 120 combined with a suction means. The suction means 115*b* of different modules can therefore be activated at different times depending on the drying or waiting times required for each colorant before a rotation of the carousel 305.

The carousel 305 can be paced to change position at a fixed frequency. The frequency can be between 30 and 60 seconds. The various modules are distributed on the periphery of the carousel 305, which comprises a number of locations. Preferably, the carousel comprises more than ten locations. Preferably, the carousel 305 comprises forty locations.

For example, in some embodiments: a first slide 105 is positioned on the carousel 305, the carousel 305 turns one position which makes it possible to place it in the smearing position and, possibly, to deposit another slide. The smear must dry several minutes before receiving a first colorant. Therefore the first staining module must be not be next but rather several positions further, based on the desired rotation rate and drying time.

In some embodiments, the device 30 is accompanied by a module comprising a conveyor in translation on which are positioned slides 105 along its axis 110. Each slide 105 is first positioned under a distributor, then under a smearing means 145, equipped with a lifting means 150, which is lowered while a drop is deposited onto a preceding slide. The translation of the conveyor thus spreads the organic liquid on the slide 105.

In this embodiment, the slides 105 are loaded on the carousel 305 impregnated with the dried organic liquid.

Figure 6:
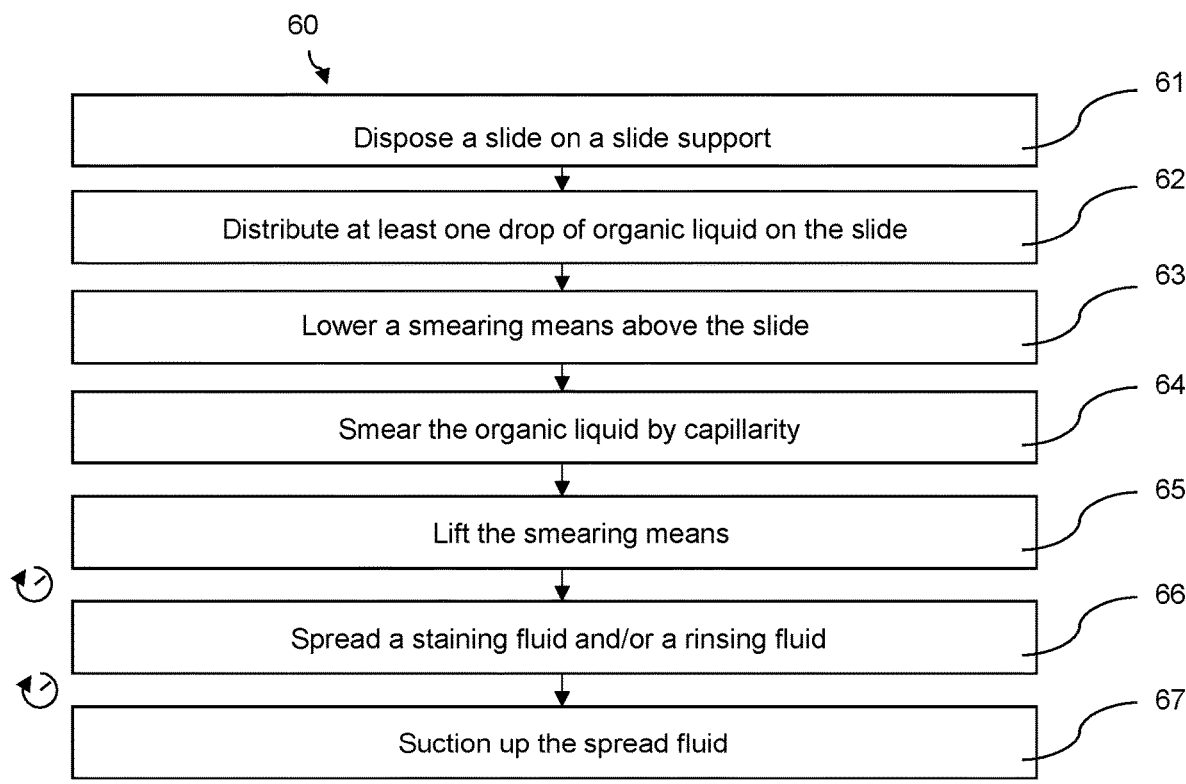
FIG. 6 represents, schematically and in the form of a logical diagram, a particular series of steps of the method that is the subject of the present invention.
Figure 7:
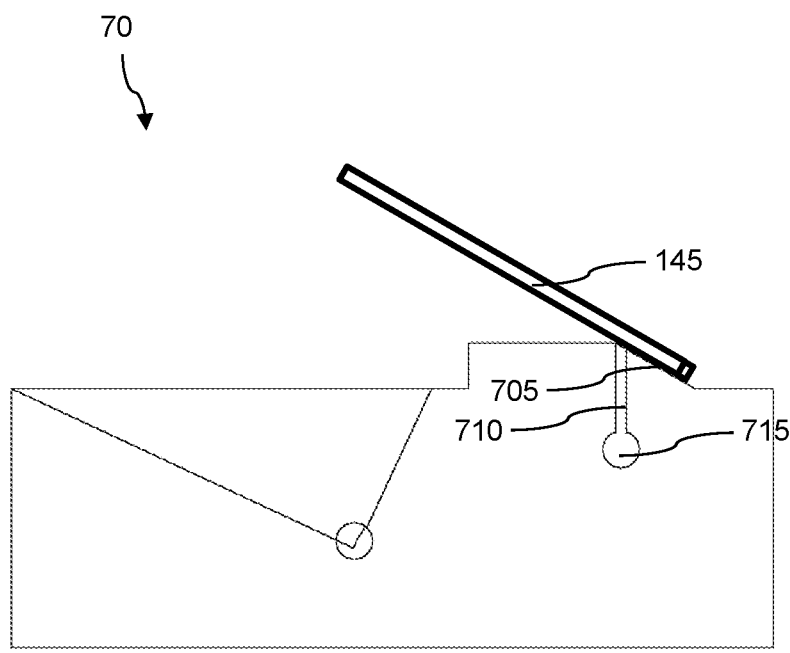
FIG. 7 represents, schematically and in a side view, a first particular embodiment of a cleaning tank.
Figure 8:
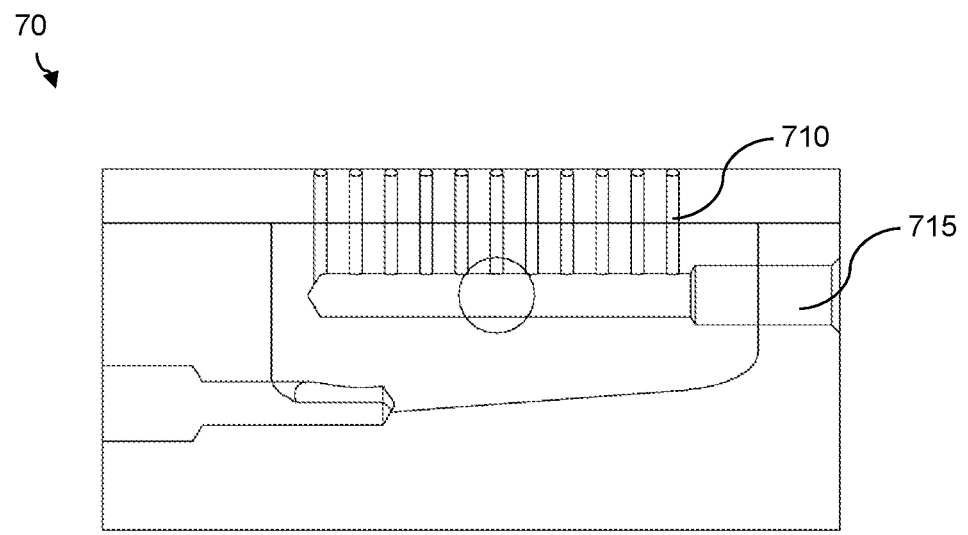
FIG. 8 represents, schematically and in a front view, the first particular embodiment of a cleaning tank.

FIG. 6 shows a series of steps of method 60 for staining an organic material on at least one slide 105, said slide 105 defining an axis 110 contained within the plane of the slide 105, said method comprising the following steps:

positioning 61 at least one slide 105 on at least one support, 205 or 310, of the slide 105;

spreading 66 a staining fluid and/or a rinsing fluid on the slide 105 by means of a linear element 120 along an axis perpendicular to the axis 110 of the slide 105; and suctioning 67 the staining fluid and/or a rinsing fluid by means of a linear element 120 along an axis 160 perpendicular to the axis 110 of the slide 105.

In some embodiments, the method 60 also comprises the following steps:

distributing 62 at least one drop of organic liquid on the slide 105;

lowering 63 a smearing means 145 above the slide 105;

smearing 64 the organic liquid along the axis 110 of the slide 105 by movement between the smearing means 145 and the slide 105; and lifting 65 the smearing means 145.

Preferably, the method 60 comprises a step of drying the organic liquid and/or a staining fluid. The drying step preferably occurs after each smearing step and after each spreading step. The drying step is shown by a stopwatch in FIG. 6.

The positioning step 61 can be manual, for example on a support 205 of FIG. 2, or automated, for example on a support 310 of device 30.

The distribution step 62 is carried out by a distributor 170. Preferably, the drop is distributed on the axis 110 of the slide 105. Preferably, the drop is distributed in an area of the slide 105 around the middle of the slide 105 along the axis 110 and whose dimension along the axis 110 of the slide 105 is less than seventy-five percent of the dimension of the slide 105. A drop has a volume of the order of five microliters.

The lowering step 63 is utilized by the lifting means 150. The smearing step 64 is performed by the lowered smearing means 145. The movement of the smearing means 64 along the axis of the slide 105 is sufficient to smear the organic liquid 165 by capillarity. The lifting step 65 is performed by activating the lifting means 150. The smearing means 145 is lifted to avoid interfering with the staining during the spreading step 66.

The lowering step 66 is utilized by the spreading means 115*a*. During the spreading step 66, a staining fluid and/or a rinsing fluid can be spread. In some embodiments, the method 60 also comprises a step of supplying at least two fluids during the spreading step 66. The spreading 66 is therefore a simultaneous spreading of two staining fluids. The spreading step 66 can be preceded by a step of mixing two staining fluids. The spreading step 66 can be utilized simultaneously with a suction step 67.

The suction step 67 is utilized by the suction means 67.

The method 60 can comprise several repetitions of a spreading step 66 and suction step 67 pair.

In some embodiments, the method 60 also comprises a step of relative movement between, a spreading step 66, a smearing step 64 and/or a suction step 67, along the axis 110 of one slide 105 to the axis 110 of another slide 105. Such relative movements are described with reference to FIGS. 4 and 5, for example.

In some embodiments, the method 60 comprises the following prior steps:

mixing tubes of organic liquid by rotation; and during the positioning step 61:

piercing a plug of the tube by a needle;

extracting a predefined amount of organic liquid;

forming a drop of organic liquid at the end of a thin tube, known as a "pipette", contained in the dispenser and emerging close to the slide.

In some embodiments, the method 60 comprises a step of cleaning the smearing means 145 by contact with the cleaning liquid.

Preferably, the method is utilized by one of the embodiments 10, 20 or 30 described above.

In the embodiments shown in FIGS. 1 to 5, a slide 105 is placed in a slide support 205 during the positioning step 61. Then a drop of organic liquid is distributed on the slide 105 by the distribution means during a distribution step 62. The line segment 146 of the smearing means 145 is placed opposite the drop then lowered during the lowering step 63. The lowering of the smearing means 145 by the lifting means 150 spreads the drop on the slide 105 by capillarity. Then the lowered smearing means 145 is displaced along the axis 110 of the slide 105 according to the smearing step 64. The smearing means 145 is then lifted during a lifting step.

The device 10 of a module of the device 10 or the slide 105 is displaced to put the spreading means 115a opposite the location where the drop of organic liquid has been deposited. The movement can be along the axis of the slide 105 to a predefined location or under a different module. The spreading means 115a is supplied with at least one staining liquid and the device 10 is displaced along the axis 110 of the slide 105 in the same direction as the smearing direction when the staining liquid is injected and emerges from the linear element 120 during the spreading step 66.

Then, the device 10 of a module of the device 10 or the slide 105 is displaced to put the suction means 115b opposite the location where the drop of organic liquid has been deposited. The movement can be along the axis of the slide 105 to a predefined location or under a different module. The suction means 115b is put into operation and the device 10 is displaced along the axis 110 of the slide 105 in the same direction as the smearing direction when the staining liquid is suctioned by a linear element 120 after a predefined length of time based on the staining liquid during the suction step 67.

The spreading step 66 and suction step 67 can be repeated several times with several different staining or rinsing fluids. The staining fluids can be mixed.

Preferably, the method 60 utilizes the functions of the device 10, 20 or 30.

As can be understood from reading the present description, the following means may also be called:
for a spreading means: a distributer, a distribution circuit or a spreader;
for a suction means: a suction unit, a suction circuit or a suction pump;
for a movement means: a movement motor;
for a mixing means: a blender or a mixer;
for a smearing means: a spreader or an applicator;
for a lifting means: lifter or hoist;
for a control means: controller;
for a means for setting in rotation: a rotation motor; and
for a supply means: a supply circuit or a supply pump.

The invention claimed is:

1. A system for staining an organic element, the system comprising:
a slide support including at least one slide configured for holding an organic element thereon;
at least one liquid supply means for supplying rinsing liquid;
a spreading means for spreading liquid, the spreading means having an element extending across the slide support, said spreading means is coupled to said at least one liquid supply means and being configured to receive rinsing liquid from the at least one liquid supply means and to spread the rinsing liquid on the at least one slide;
a suction means for suctioning the rinsing liquid from the at least one slide;
a movement means coupled to said spreading means and said suction means, said movement means is configured for translational movement of said spreading means and said suction means along the slide support; and
a controller electronically coupled to the spreading means and the suction means, said controller is configured for simultaneously activating the spreading means and the suction means.

2. The system of claim 1, wherein the suction means includes a linear element extending across the slide support.

3. The system of claim 1, wherein the at least one liquid supply means comprises two liquid supply means configured for supplying the spreading means with rinsing liquids simultaneously.

4. The system of claim 3, wherein the spreading means comprises a means for mixing liquids coming from the two liquid supply means.

5. The system of claim 1, further comprising:
dispenser configured for providing organic liquid on the at least one slide;
smearing slide coupled to the dispenser and positioned across the slide support, said smearing slide is configured to selectively be lowered such that and edge of the smearing slide contacts the at least one slide for smearing organic liquid over the at least one slide.

6. The system of claim 5, which further comprises a tank fixedly mounted on the slide support, and being configured to allow inserting the smearing slide into the tank.

7. The system of claim 1, wherein the at least one liquid supply means is configured to supply said spreading means with rinsing fluid in an amount of 0.4-1 milliliter for a surface area of 25 millimeters by 75 millimeters.

8. A method for staining an organic element on at least one slide, the method being comprising the following steps:
positioning the at least one slide holding the organic element on at least one slide support;
spreading at least a rinsing liquid on the at least one slide by means of an element extending across the at least one slide; and
suctioning the rinsing liquid by means of an element extending across the at least one slide;
wherein the element for suctioning is positioned in succession to the element for spreading;
wherein spreading of the rinsing liquid is performed simultaneously to suctioning the rinsing liquid, thereby creating on the at least one slide, a turbulent flow of the rinsing liquid, and thereby cleaning impurities of the organic element spread over the at least one slide without detaching cells contained in the organic element.

9. The method according to claim 8, which also comprises the following steps, prior to said spreading step:
lowering a smearing slide above the at least one slide;
smearing the organic element over the at least one slide by movement between the smearing slide and the at least one slide; and
lifting the smearing slide.

10. The method according to claim 9, which comprises cleaning the smearing slide by lowering the smearing slide into a tank comprising a cleaning liquid.

11. The method according to claim 8, wherein said rinsing liquid is a mixture of two kinds of rinsing liquids.

12. The method according to claim 8, wherein the step of spreading includes spreading the rinsing liquid in an amount of 0.4-1 milliliter for a surface area of 25 millimeters by 75 millimeters.

* * * * *